United States Patent
Vesel

(10) Patent No.: US 6,240,345 B1
(45) Date of Patent: May 29, 2001

(54) INTEGRITY MONITOR FOR TCAS MUTUAL SUPPRESSION

(75) Inventor: Andrew M. Vesel, Coral Springs, FL (US)

(73) Assignee: AlliedSignal Inc., Morristown, NJ (US)

(*) Notice: Subject to any disclaimer, the term of this patent is extended or adjusted under 35 U.S.C. 154(b) by 0 days.

(21) Appl. No.: 08/048,343

(22) Filed: Apr. 15, 1993

(51) Int. Cl.⁷ .................... G08G 5/04; G01S 7/00
(52) U.S. Cl. .................... 701/31; 342/30; 342/455
(58) Field of Search .................... 364/436, 461, 364/424.03, 439; 342/40, 30, 165, 455; 701/29, 30, 117, 120, 301

(56) References Cited

U.S. PATENT DOCUMENTS

| | | | |
|---|---|---|---|
| 3,353,181 | 11/1967 | Preuss | 342/165 |
| 3,697,876 | 10/1972 | Robbins et al. | 342/47 |
| 3,713,161 | 1/1973 | Rice | 342/455 |
| 3,821,739 | 6/1974 | Von Fange | 342/169 |
| 4,789,865 * | 12/1988 | Litchford | 364/461 |
| 4,970,510 * | 11/1990 | Stelling | 364/424.03 |
| 5,077,673 * | 12/1991 | Brodegard et al. | 364/461 |
| 5,081,457 * | 1/1992 | Motisher et al. | 342/40 |
| 5,089,822 * | 2/1992 | Abaunza et al. | 342/30 |
| 5,157,615 * | 10/1992 | Brodegard et al. | 364/461 |
| 5,177,447 * | 1/1993 | Marino et al. | 364/424.03 |
| 5,208,591 * | 5/1993 | Ybarra et al. | 364/439 |
| 5,264,853 * | 11/1993 | Sturm et al. | 342/40 |

* cited by examiner

Primary Examiner—William A. Cuchlinski, Jr.
Assistant Examiner—Edward Pipala

(57) ABSTRACT

An integrity monitor for TCAS mutual suppression checks the interface circuits and cabling of the suppression system that lies between the TCAS processor and the transponder. The monitor starts by interrogating the transponder while disabling suppression. If no reply is received, the transponder is not functional. If a reply is received, interrogation of the transponder occurs again, however, this time suppression is enabled. If a reply is received, the suppression system has failed and TCAS alarms will be inhibited. If a reply is not received, the suppression system is working.

15 Claims, 2 Drawing Sheets

TCAS/MODE S MUTUAL SUPPRESSION SYSTEM

INTEGRITY MONITOR FOR TCAS MUTUAL SUPPRESSION

BACKGROUND OF THE INVENTION

1. Field of the Invention

The present invention relates to Traffic Alert and Collision Avoidance Systems (TCAS) and more particularly to detecting failures in the TCAS processor.

2. Description of the Prior Art

TCAS, the Traffic Alert and Collision Avoidance System, provides for safe separation of airborne traffic. To accomplish this, an airborne interrogator, the TCAS processor, interrogates an ATC transponder of other aircraft that are in the proximity of the TCAS equipped aircraft. The replies from the transponders of the other aircraft provide altitude and range of the other aircraft to the TCAS system. The TCAS equipped aircraft also carries an ATC transponder. In order to ensure that the transponder on the TCAS equipped aircraft does not reply to interrogations from its own TCAS it is equipped with a system called mutual suppression. The mutual suppression signal from the TCAS processor effectively disables the ATC transponder on the TCAS equipped aircraft at the time of interrogation. The ATC transponder is enabled again after the interrogation. The time that the transponder is suppressed is very brief (less than 90 microseconds).

The mutual suppression signal is applied to the transponder via a cable which connects the TCAS processor, the ATC transponder, and other avionics equipment which might be affected by the TCAS transmission. If this cable becomes disconnected, or the interface circuits in the transponder or TCAS processor fail to function, it is possible for the TCAS processor to receive replies from its own transponder. If the TCAS processor receives these replies consistently, it will interpret them as coming from a very close aircraft which is at the same altitude as its own aircraft. This will cause a spurious alarm to be presented to the pilot. It will seem as though there is another aircraft very close to the pilot's aircraft and he will be instructed to maneuver to avoid it. Since the other aircraft is actually his own, the other aircraft will seem to follow him no matter what action he takes.

SUMMARY OF THE INVENTION

The present invention comprises a system capable of determining the integrity of the mutual suppression system of a TCAS unit. The present invention will inhibit alarms when it detects a failure of the mutual suppression system and will also annunciate the failure to maintenance personnel.

The system starts by interrogating its own transponder while disabling suppression. If no reply is received, the transponder is not functional. If a reply is received, interrogation of its own transponder occurs again, however, this time suppression is enabled. If a reply is received, the suppression system has failed and the alarms will be inhibited. If a reply is not received, the suppression system is working.

DETAILED DESCRIPTION OF THE INVENTION

Figure 1:
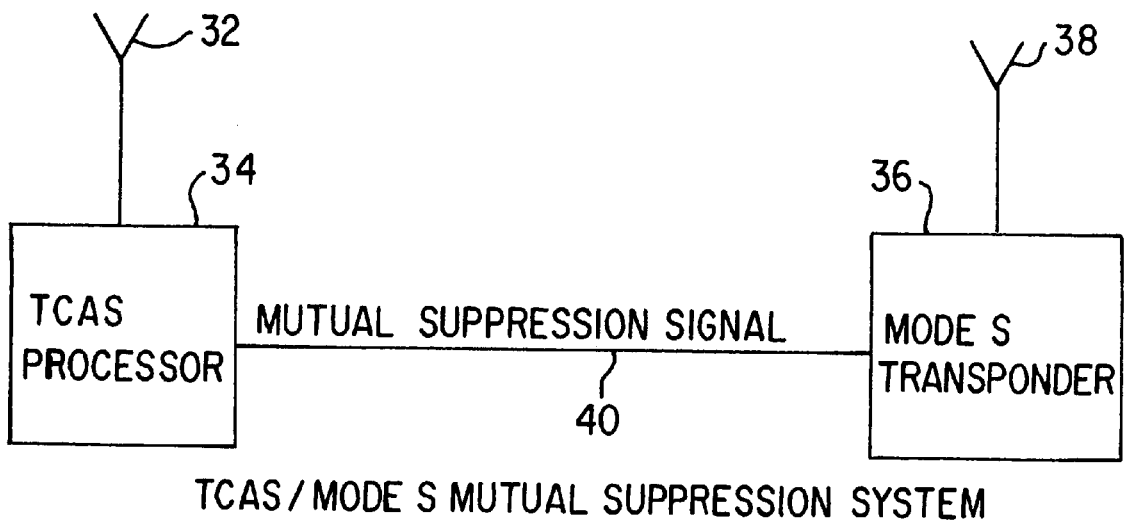
FIG. 1 illustrates a block diagram of prior art TCAS mutual suppression system.

FIG. 1 shows the interconnection of TCAS antenna 32 and TCAS processor 34 with Mode S transponder 36 and Mode S antenna 38 by way of mutual suppression cable 40. The purpose of mutual suppression signal 40 is to disable the receiver of one of the two units when the other unit transmits.

Figure 2:
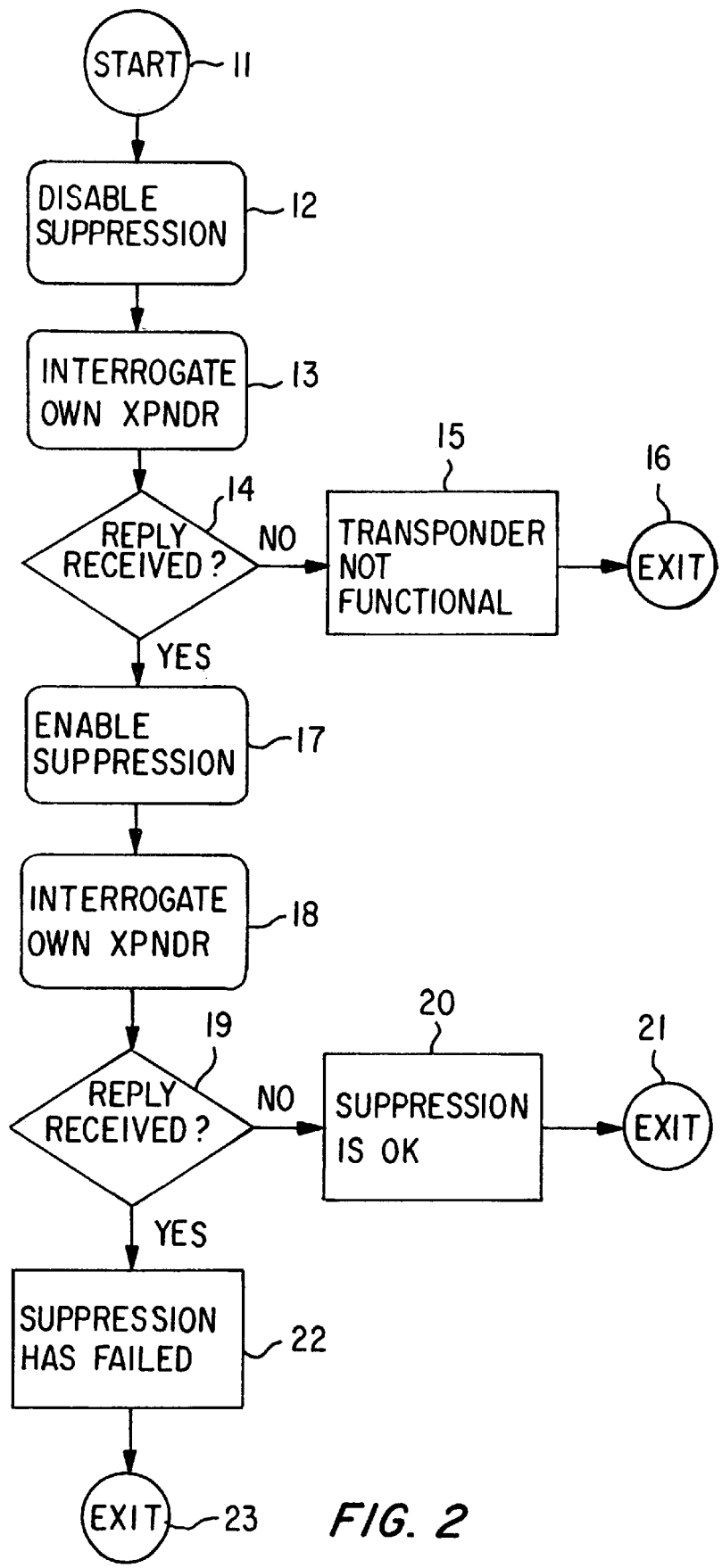
FIG. 2 illustrates a software flow diagram of an integrity monitor for a TCAS mutual suppression system according to; the present invention.

The present invention features an integrity monitor system for TCAS mutual suppression illustrated in FIG. 1. and as; implemented in software and a software flow diagram illustrated in FIG. 2. Beginning at start 11, in order to detect the failure of the mutual suppression system, the TCAS processor must be programmed to make two interrogations of its own transponder. The first can be made without activating mutual suppression so mutual suppression is disabled, as shown by disable suppression 12. Interrogation of own transponder 13 then occurs. This interrogation should elicit a reply. The Bendix/King TCAS processor already performs this first interrogation to verify the integrity of the TCAS/transponder communication. The ATC transponder on a TCAS aircraft is a Mode S transponder therefore it has a specific address which can be embedded in the interrogation. Only the Mode S on own aircraft will reply to this interrogation. (Own aircraft refers to the aircraft in which the TCAS processor and transponder are installed.) The decision of whether a reply as been received or has not been received, is illustrated by reply received 14. If a reply has not been received, the transponder is not functional, as shown by transponder not functional 15, and the integrity monitor system is exited at exit 16. If a reply has been received a second interrogation containing own aircraft's address can be issued. This time the suppression system is activated, as shown by enable suppression 17, interrogate own transponder 18 occurs, and the question of reply received 19 occurs. Own aircraft's Mode S transponder should never reply to interrogate own transponder 18 if the suppression system is functioning, as shown by suppression is OK 20. The integrity monitor system is then exited at exit 21. This provides a means of detecting whether the suppression system has failed. If TCAS detects a reply from its own transponder when it has activated the suppression system, a failure condition is detected as shown by suppression has failed 22. The integrity monitor system is then exited at exit 23.

The first interrogation (made with a deactivated suppression system) is not strictly required for the invention to work. It is included because the TCAS system already makes this interrogation and it allows the system to determine that the transponder is, in fact, capable of responding to an interrogation. When the suppression system is in good condition the TCAS must not receive a reply when the second interrogation (made with the suppression system activated) is issued. The first interrogation allows the TCAS to determine if it received no reply because the suppression system is functioning properly or if it received no reply because the transponder is not operational.

A pulse is present on the mutual suppression cable when either unit transmits. This informs the other unit to disable its receiver so that RF energy received on its antenna is disregarded. The purpose of the present invention is to detect the integrity of the mutual suppression signal. This is accomplished by first transmitting from the TCAS Processor without applying a pulse to the mutual suppression cable. This should elicit a reply from the transponder since its receiver will not have been disabled. The reply can be received and decoded by the TCAS Processor. A second interrogation can then be made by the TCAS Processor. A pulse is applied to the mutual suppression cable during the second interrogation by the TCAS Processor. If the mutual suppression cable is properly connected to the Mode S transponder, it will not reply because its receiver will have been disabled. If the TCAS Processor receives a reply, it can deduce that the suppression signal is not reaching the Mode S transponder.

The advantages of the present,invention are as follows. (1) Monitoring for activity on the suppression bus by the TCAS processor would ensure that the TCAS was connected and the bus was active. Other equipment operates on the suppression bus and it would be impossible to tell if the transponder was connected. (2) The interrogation to own transponder can be made at a low power level to minimize interference to the ATC transponder system. (3) The interrogation to own transponder can be made at regular intervals and will therefore catch even intermittent failures of the suppression system. (4) No new hardware is required. Only a change to the operating software of the TCAS processor is required.

It is not intended that this invention be limited to the hardware or software arrangement, or operational procedures shown disclosed. This invention includes all of the alterations and variations thereto as encompassed within the scope of the claims as follows.

I claim:

1. A traffic alert and collision avoidance system comprising:

TCAS processor means;

Mode S transponder means;

mutual suppression signal means connecting said TCAS processor means and said Mode S transponder means; and, integrity monitor system means for monitoring said mutual suppression signal means, including enable suppression means for enabling suppression, interrogation means for interrogating said Mode S transponder means, decision means for deciding whether a reply has been received from said interrogation means, and transmission means for transmitting results received from said decision means, said interrogating means interrogating said Mode S transponder means at regular intervals for discovering intermittent suppression failures.

2. A traffic alert and collision avoidance system as claimed in claim 1 wherein said transmission means signals that suppression is working or signals that suppression has failed.

3. A traffic alert and collision avoidance system as claimed in claim 2 wherein said transmission means inhibits TCAS alarms if suppression has failed.

4. A traffic alert and collision avoidance system as claimed in claim 3 wherein said transmission means annunciates a failure to maintenance personnel if suppression has failed.

5. A traffic alert and collision avoidance system as claimed in claim 1 wherein said interrogation means operates at a low power level when interrogating said Mode S transponder means therefore minimizing interference.

6. A traffic alert and collision avoidance system as claimed in claimed 1 further comprising exit means for exiting said integrity monitor system means.

7. An integrity monitor for TCAS mutual suppression comprising:

enable suppression means for enabling suppression;

interrogation means for interrogating own transponder, said interrogation means interrogating at regular intervals for discovering intermittent suppression failures;

decision means for deciding whether a reply has been received from said interrogation means; and, transmission means for transmitting results received from said decision means.

8. An integrity monitor for TCAS mutual suppression as claimed in claim 7 wherein said transmission means inhibits TCAS alarms if suppression has failed.

9. An integrity monitor for TCAS mutual suppression as claimed in claim 7 wherein said transmission means annunciates a failure to maintenance personnel if suppression has failed.

10. An integrity monitor for TCAS mutual suppression as claimed in claim 7 wherein said interrogation means operates at a low power level when interrogating said own transponder therefore minimizing interference.

11. An integrity monitor for TCAS mutual suppression comprising:

disable suppression means for disabling suppression;

first interrogation means for interrogating own transponder for a first time;

decision means for deciding whether a reply has been received from said first interrogation means;

enable suppression means;

second interrogation means for interrogating own transponder for a second time said second interrogation means interrogating at regular intervals for discovering intermittent suppression failures;

second decision means for deciding whether a reply has been received from said second interrogation means;

transmission means for transmitting results received from said second decision means; and exit systems means for exiting after said decision means decides whether a reply has been received from said first interrogation means and no reply has been received.

12. An integrity monitor for TCAS mutual suppression as claimed in claim 11 further comprising:

exit means for exiting said integrity monitor after said transmission means transmits results.

13. An integrity monitor for TCAS mutual suppression as claimed in claim 11 wherein said transmission means inhibits TCAS alarms if suppression has failed.

14. An integrity monitor for TCAS mutual suppression as claimed in claim 13 wherein said transmission means annunciates a failure to maintenance personnel if suppression has failed.

15. An integrity monitor for TCAS mutual suppression as claimed in claim 14 wherein said second interrogation means operates at a low power level when interrogating said own transponder therefore minimizing interference.

* * * * *